United States Patent [19]

Shawver et al.

[11] Patent Number: 4,721,282

[45] Date of Patent: Jan. 26, 1988

[54] VACUUM CHAMBER GATE VALVE

[75] Inventors: Michael J. Shawver, Hayward; Robert T. Lobianco, Sunnyvale, both of Calif.

[73] Assignee: LAM Research Corporation, Fremont, Calif.

[21] Appl. No.: 942,516

[22] Filed: Dec. 16, 1986

[51] Int. Cl.⁴ .................................. F16K 31/122
[52] U.S. Cl. .................................. 251/62; 251/158; 251/193
[58] Field of Search ............... 251/62, 193, 335.3, 251/326, 203, 63.4, 158

[56] References Cited

U.S. PATENT DOCUMENTS

| | | | |
|---|---|---|---|
| 2,838,066 | 6/1958 | Harris | 251/326 X |
| 2,880,620 | 4/1959 | Bredtschneider | 251/335.3 X |
| 3,442,295 | 5/1969 | Ver Nooy | 251/193 X |
| 3,525,350 | 8/1970 | Hosek | 251/62 X |
| 3,556,472 | 1/1971 | Grove | 251/326 X |
| 3,610,574 | 10/1971 | Hartman | 251/193 X |
| 4,195,813 | 4/1980 | Cho | 251/203 |
| 4,433,951 | 2/1984 | Koch et al. | 414/217 |
| 4,526,341 | 7/1985 | Thomas | 251/335.3 |

Primary Examiner—Alan Cohan
Attorney, Agent, or Firm—Townsend & Townsend

[57] ABSTRACT

A gate valve assembly includes a housing, a shaft axially mounted within the housing, and a gate member secured to one end of the shaft. A mechanism within the housing is provided for axially extending and rotating the shaft in order to move the gate member into sealing engagement with a port in a processing chamber. By providing an expandable seal about the shaft and secured to the housing, the mechanical drive portion of the valve may be isolated from the interior of the chamber. The valve is particularly suitable for use with loadlocks and other chambers having a low pressure environment.

15 Claims, 4 Drawing Figures

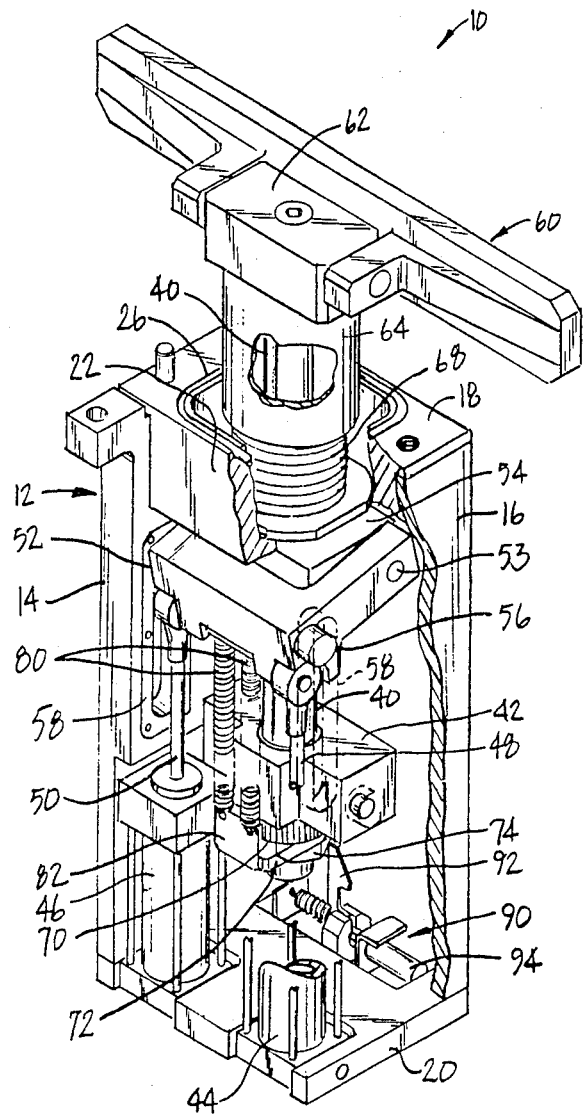
FIG._1.

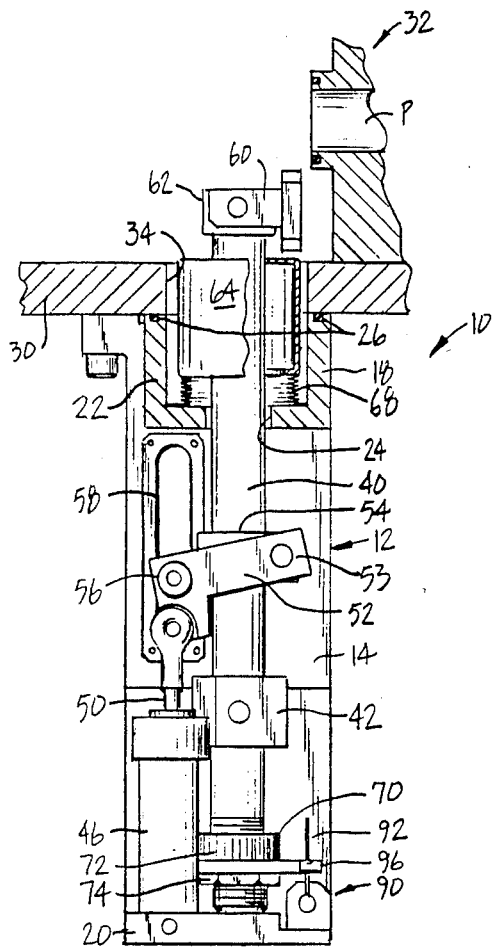
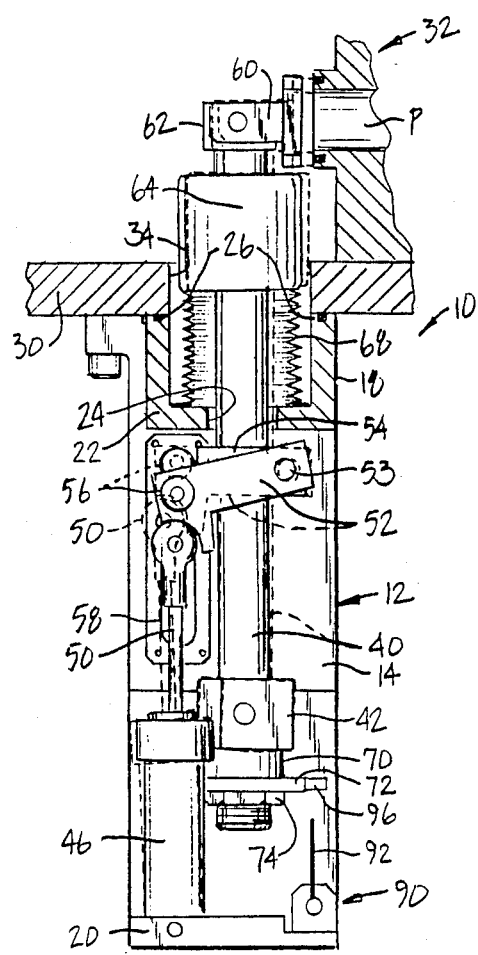
FIG._2.  FIG._3.

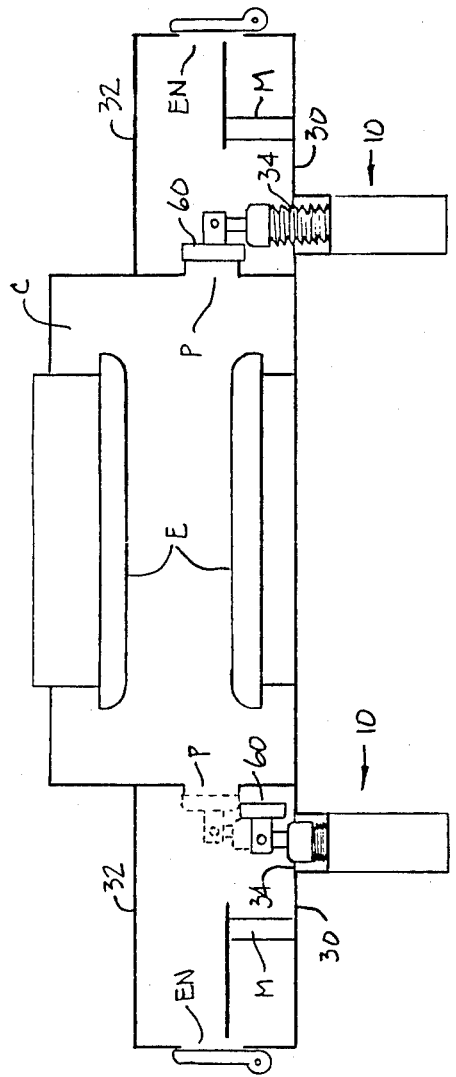
FIG.—4.

VACUUM CHAMBER GATE VALVE

BACKGROUND OF THE INVENTION

1. Field of the Invention

The present invention relates generally to the construction of valves and valve actuators, and more particularly to a gate valve and actuator for use in vacuum processing equipment.

2. Description of the Background Art

Loadlocks, also referred to as airlocks, are routinely employed in a variety of circumstances where material must be moved from an area at a first pressure to a different area at a second pressure. The loadlock is a sealable chamber where the internal pressure can be adjusted to match the outside pressure found at one or more ports. Of particular interest to the present invention are loadlocks which allow transport of semiconductor wafers between a location at a first pressure, typically ambient, and processing equipment operating at very low pressures, such as plasma etchers and the like.

While the concept of a loadlock is straight forward, the design of loadlocks is complicated by a number of competing considerations. For example, the loadlock must be sturdy and able to withstand the differential pressures expected during operation. In particular, the loadlocks must be able to provide positive closure and sealing of the port between the loadlock and the processing chamber. Heretofore, such positive sealing has been accomplished by providing relatively complicated linkages within the loadlock which are able to move a gate closure member between a tightly sealed position and an open position free from obstructing the port. See, for example, U.S. Pat. No. 4,433,951 where a particular actuating linkage is illustrated in FIGS. 2A-2C.

The valve actuating mechanisms of the prior art, and of U.S. Pat. No. 4,433,951 in particular, suffered from a number of disadvantages. In the first place, the mechanisms have included a large number of exposed joints, bearings, hinges, and the like, which generate particulates whenever the mechanism is actuated. Such particulates can deposit on the wafers and interfere with the desired processing operation. Moreover, such joints are difficult to lubricate in a low pressure environment, where the lubrication fluid quickly vaporizes. In addition, location of the gate valve actuating mechanism within the loadlock increases the size of the loadlock required for a given application. Such increased size in turn, increases the time and power required to draw a vacuum, as well as increasing the capital costs associated with producing the loadlock.

For these reasons, it would be desirable to provide a gate valve assembly for use with a low pressure loadlock, where the assembly includes few or no joints, bearings, hinges and the like exposed to the low pressure environment within the loadlock. It would be particularly desirable if the gate valve assembly occupied a minimum volume within the loadlock, and provided for substantially complete retraction of the gate member away from the port so that access through the port is unobstructed.

SUMMARY OF THE INVENTION

According to the present invention, a gate valve assembly for mounting externally on a loadlock apparatus includes a housing capable of being secured to the outside of the loadlock, a reciprocatable shaft mounted axially within the housing and extending through an opening into the loadlock, and a gate member mounted at the end of the shaft within the loadlock. A mechanism for reciprocating the shaft to move the gate member between an open position and a closed position is mounted entirely within the housing. By providing an expandable seal member, typically a metal bellows, between the shaft and the housing, all mechanical joints, bearings, hinges, and the like are totally isolated from the inside of the loadlock. In this way, loss of lubricants and generation of particulates within the loadlock are avoided. In addition, routine maintenance and repair of the valve assembly is greatly facilitated as the mechanism is exposed and accessible. Moreover, in the event of failure, the entire gate valve assembly is easily removed and replaced, avoiding costly downtime for the loadlock and associated processing equipment.

The actuation mechanism of the present invention is particularly designed to provide very tight sealing of the loadlock port when closed and maximum clearance of the port when opened. The shaft is mounted in a bearing block pivotally secured within the housing, and driven axially by a suitable driver, such as a piston and cylinder assembly. The driver is attached to the shaft by a transverse link, and a spring holds the shaft in a first orientation relative to the link when the shaft is retracted. Motion of the link is restricted by an axial guide track, and the motion of the shaft is also in the axial direction during a first portion of travel of the driver. At a preselected point, however, a stop on the shaft prevents further axial travel. The link continues to be axially driven by the drivers over a second portion of travel. As the link is pivotally connected to the shaft, however, the axial motion of the link is converted into lateral motion of the shaft. In this way, the initial axial motion of the shaft provides for the primary movement of the gate member toward (or away from) the processing chamber port. The secondary lateral movement provides for positive sealing of the gate member against the port. Such secondary lateral movement is accomplished using an over-center locking mechanism which is capable of sealing against both pressure and vacuum and prevents the valve from opening even when pressure is lost to the piston and cylinder assemblies.

As the length of axial travel is substantially unlimited, and the sealing force provided by the lateral travel may be varied over a wide range, the gate valve assembly of the present invention can be adapted for externally mounting on virtually any type of loadlock or other chamber where it is desired to minimize both volume and generation of particulate contaminants.

BRIEF DESCRIPTION OF THE DRAWINGS

FIG. 1 is an isometric view of a gate valve assembly constructed in accordance with the principles of the present invention, with portions broken away.

FIG. 2 is a side elevational view of the embodiment of FIG. 1, shown in section with the gate in its lowered, opened position.

FIG. 3 is a view similar to FIG. 2, with the gate member shown in its raised position in full line and in its closed position in broken line.

FIG. 4 is a schematic illustration showing the mounting of the gate valve assembly in loadlocks associated with a plasma etching chamber.

DESCRIPTION OF THE PREFERRED EMBODIMENTS

Referring to FIGS. 1-3, a gate valve assembly 10 constructed in accordance with the principles of the present invention will be described in detail. The gate valve assembly 10 includes a housing 12 having a pair of side walls 14 and 16, a top plate 18, and a bottom plate 20. The top plate 18 defines a well 22 having an opening 24 (best seen in FIGS. 2 and 3) at its bottom. An O-ring 26 is located on the upper surface of top plate 18 about the periphery of well 22. The O-ring 26 allows the housing 12 to be sealingly mounted on a wall 30 of a vessel, typically a loadlock 32, only a portion of which is illustrated in FIGS. 2 and 3.

The vessel wall 30 includes a port 34 to allow penetration of the gate valve assembly 10, as will be described in more detail hereinafter. The peripheral geometry and dimensions of the well 22 will generally correspond to those of the opening 34 so that the opening and well will together form a sealed unit capable of maintaining a vacuum within the interior of the loadlock 32.

A shaft 40 is slidably mounted in a bearing block 42 which in turn is pivotally mounted between the side walls 14 and 16 of the housing 12. Thus, the shaft 40 is mounted so that it is generally free to move axially within the housing 12 and to pivot about the axis defined by the bearing block 42.

A piston and cylinder assembly includes a pair of double-acting piston and cylinders 44 and 46 which are pivotally mounted on bottom plate 20, as best illustrated in FIG. 1. Piston rods 48 and 50 are pivotally attached to one end of a link assembly 52. The link assembly 52, in turn, is pivotally attached at its other end to a fixed block 54 which is secured about shaft 40 near its middle.

Cam followers 56 (only one of which is illustrated in the drawings) are mounted on opposite sides of the link assembly 52 on the same end where the piston rods 48 and 50 are attached. The cam followers 56 travel in guide tracks 58 formed in each of the side walls 14 and 16. It will be appreciated that the cam followers 56 and guide tracks 58 will generally limit motion of the link assembly 52 to the axial direction.

A gate member 60 is mounted at the upper end of shaft 40. As illustrated, the gate member 60 is an elongate plate pivotally mounted on a block 62 which is fixedly attached to the upper end of shaft 40. Such a gate member is suitable for sealing against a slot-type opening. It will be appreciated that gate members having other geometries may be employed for sealing against differently shaped openings.

Bellows 68 provides an expandable seal between shaft 40 and well 22 of top plate 18, and bellows cap 64 protects the bellows 68 from mechanical damage. The bellows 68 is secured about the upper end of shaft 40 in such a manner that prevents gas leakage, even when exposed to very high vacuum. Similarly, the lower end of bellows 68 is sealed to well 22 about the opening 24 in a similar vacuum-tight manner. The shaft 40 may thus be translated axially and laterally within the opening 24 without breaking the seal which has been formed about port 34. It will be further appreciated that such sealing prevents the exposure of all mechanical joints, hinges, bearings, and the like to the vacuum which is periodically formed in loadlock 32.

An adjustable stop member 70 is threadably received on the lower end of shaft 40. A plate 72 is also secured on the bottom of shaft 40 by a nut 74. The stop member 70 stops upward axial travel of the shaft 40 when it contacts the lower surface of bearing block 42, as illustrated in FIG. 3. The downward limit on axial travel of shaft 40 is defined when the lower end of the shaft contacts the upper surface of bottom plate 20, as illustrated in FIG. 2.

As best illustrated in FIG. 1, the lower end of shaft 40 is supported on link assembly 52 by a pair of springs 80 which are attached to plate 72 by a vertical tab 82. The springs 80 are under tension and raise shaft 40 as the link assembly 52 is driven upward by the piston and cylinder assemblies 44 and 46, as illustrated in FIGS. 1 and 2, and as illustrated in full line in FIG. 3. It will be appreciated that in the absence of springs 80, the shaft 40 would not be raised by the piston and cylinder assemblies 44 and 46 since there is no other linkage.

A latch mechanism 90 includes a hook 92 actuated by a solenoid 94. Hook 92 engages a pin 96 on plate 72 when the shaft 40 is in its fully lowered position, as illustrated in FIG. 2. The shaft 40 can only be raised if the solenoid 90 is first actuated to release hook 92 from pin 96.

Referring now to FIG. 4, gate valve assemblies 10 of the present invention are conveniently mounted on loadlocks 32 used in conjunction with a low pressure processing chamber C. As illustrated, the processing chamber C is a plasma etcher including a pair of opposed electrodes E having a pair of access ports P on either side. A wafer transport mechanism M is provided in each of the loadlocks L in order to receive and discharge wafers through entry and access ports EN and P.

The gate valve assemblies 10 are mounted through openings 34 in the loadlock wall 30. The gate valves 10 are arranged so that the gate member 60 lies completely below the port P when it is in its lowered or opened position, as illustrated at the left hand side of FIG. 4 in full line. When raised, the gate member 60 covers and seals against the port P, as illustrated at the right hand side of FIG. 4.

Referring again to FIGS. 2 and 3 in particular, the operation of the gate valve assembly 10 will be described in greater detail. In FIG. 2, the shaft 40 is lowered and the gate member 60 lies below and slightly to the left of port P in chamber 32. In order to close gate member 60 against port P, shaft 40 is first raised by actuating piston and cylinders 44 and 46. Initially, the shaft is raised substantially axially with the relative inclination of link member 52 remaining fixed relative to shaft 40 and the remaining components of the valve.

The axial travel of shaft 40 continues until stop member 70 engages the lower surface of bearing block 42. Once this happens, further axial movement of shaft 40 is prevented. Rod members 48 and 50 of the piston and cylinders 44 and 46, however, continue to move upward as the guide tracks 58 allow further movement of cam followers 56.

Referring in particular to FIG. 3, the situation where stop member 70 has just engaged block 42 is illustrated in full line. Continued travel of piston rod 50 is illustrated in broken line. The left hand side of link assembly 52 is caused to rise relative to shaft 40, extending springs 80. The inclination of link member 52 relative to shaft 40 causes pivot point 53 to move laterally to the right, as illustrated in FIG. 3. Such movement, in turn, causes shaft 40 to rotate several degrees about the axis defined by bearing block 42, in a clockwise direction. Such rotation, in turn, causes the gate member 60 to move to the right and into port P, compressing O-rings around the port to create a firm seal.

The length of track 58 allows the left hand side of the link assembly 52 to travel slightly above the pivot point 53. Such "over center" travel prevents accidental opening of the valve assembly 10, even if power to the piston and cylinders 48 and 50 is lost.

It should be noted that a vertical obstruction above the gate member 60 or block 62 during actuation will cause springs 80 to elongate before the stop member 70 contacts the lower surface of bearing block 42. This will cause link assembly 52 to be driven over center prematurely and port P will be only partially covered by gate member 60. This provides an important safety feature in case the gate valve assembly 10 is actuated to close when travel of the gate 60 is obstructed by, for example, the wafer transport mechanism M or an operator's hand.

The valve assembly 10 may be opened by actuating the piston and cylinders 44 and 46 in the downward direction to retract the link assembly 52 and lower shaft 40 to the configuration illustrated in FIG. 2.

Although the foregoing invention has been described in some detail by way of illustration and example for purposes of clarity of understanding, it will be obvious that certain changes and modifications may be practiced within the scope of the appended claims.

What is claimed is:

1. A gate valve assembly for mounting on a port in a chamber wall, said gate valve comprising:
   an elongate housing having means at one end for sealing to the chamber wall about the port;
   a bearing block pivotally mounted within the housing;
   a shaft slidably received by the bearing block and extending through said one end of the housing;
   a gate member attached to one end of the shaft;
   an expandable seal member sealing the shaft to the housing to prevent leakage through the one end; and
   means in the other end of the housing for translating the shaft through the bearing block and for pivoting the bearing block to move the gate member between an opened position and a closed position.

2. A gate valve assembly as in claim 1, wherein the means for sealing includes an O-ring.

3. A gate valve assembly as in claim 2, wherein the expandable seal member includes a bellows.

4. A gate valve assembly as in claim 1, wherein the means for translating and pivoting the shaft includes a piston and cylinder assembly, a transverse link coupling the piston and cylinder to the shaft, and track means for guiding travel of the link so that the shaft is caused to move axially relative to the housing during a first portion of travel and transversely relative to the housing during a second portion of travel.

5. A gate valve assembly as in claim 4, wherein the means for translating further includes a spring attaching the link to the shaft and a stop member which stops axial travel of the shaft prior to the end of travel of the piston and cylinder assembly, so that the piston and cylinder assembly will cause the shaft to pivot in the bearing block after axial travel has been stopped.

6. A gate valve assembly comprising:
   an elongate housing having at least one opening;
   a bearing block pivotally mounted within the housing;
   a shaft slidably received by the bearing block and extending through the one opening;
   a gate member attached to the end of the shaft which extends through the one opening; and
   means for translating the shaft through the bearing block and for pivoting the bearing block so that the gate member moves between an opened position and a closed position.

7. A gate valve assembly as in claim 6, wherein the means for translating the shaft includes a piston and cylinder assembly mounted on the housing, a transverse link coupling the piston and cylinder assembly to the shaft, and track means for guiding travel of the link so that the shaft is caused to move axially relative to the housing during a first portion of travel and transversely relative to the housing during a second portion of travel.

8. A gate valve assembly as in claim 7, wherein the means for translating the shaft includes a spring attaching the link to the shaft and a stop member which stops axial travel of the shaft in the bearing block prior to the end of travel of the piston and cylinder assembly, so that the piston and cylinder assembly will cause the shaft to pivot in the bearing block after axial travel has been stopped.

9. A gate valve assembly as in claim 6, further including means on the housing proximate the one opening for sealing the housing to a port in a wall.

10. A gate valve assembly as in claim 9, wherein the means for sealing includes an O-ring.

11. A gate valve assembly for mounting on a port in a chamber wall, said gate valve comprising:
    an elongate housing having at least one opening and means proximate the one opening for sealing the housing about the port;
    a bearing block pivotally mounted within the housing;
    a shaft slidably received by the bearing block and extending through the one opening;
    a gate member attached to the end of the shaft which extends through the opening so that said gate member will extend through the port into the chamber when the housing is mounted on the chamber;
    an expandable seal member sealing the shaft to the housing to prevent leakage through the one opening; and
    means for translating the shaft through the bearing block and for pivoting the bearing block so that the gate member moves between an opened and a closed position.

12. A gate valve assembly as in claim 11, wherein the means for sealing includes an O-ring.

13. A gate valve assembly as in claim 12, wherein the expandable seal member includes a bellows.

14. A gate valve assembly as in claim 11, wherein the means for translating the shaft includes a piston and cylinder assembly mounted on the housing, a transverse link coupling the piston and cylinder assembly to the shaft, and track means for guiding travel of the link so that the shaft is caused to move axially relative to the housing during a first portion of travel and transversely relative to the housing during a second portion of travel.

15. A gate valve assembly as in claim 14, wherein the means for translating the shaft further includes a spring attaching the link to the shaft and a stop member which stops axial travel of the shaft in the bearing block prior to the end of travel of the piston and cylinder assembly, so that the piston and cylinder assembly will cause the shaft to pivot in the bearing block after axial travel has been stopped.

* * * * *